June 25, 1929.  R. H. BROWN  1,718,851
CHILD'S COLLAPSIBLE VEHICLE
Filed Sept. 29, 1928  3 Sheets-Sheet 1

INVENTOR.
Reinhardt H. Brown,
BY John Howard McElroy
his ATTORNEY.

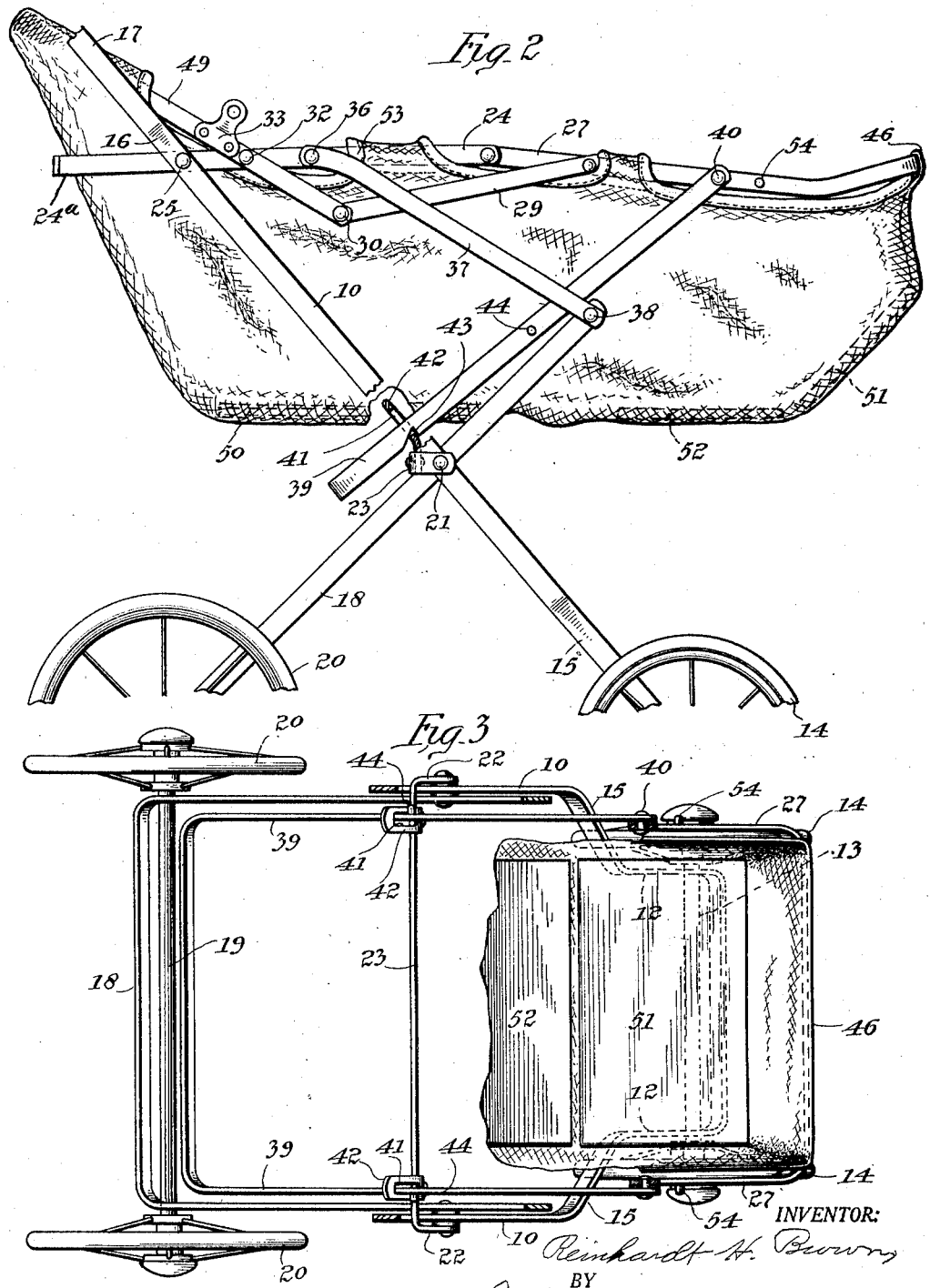

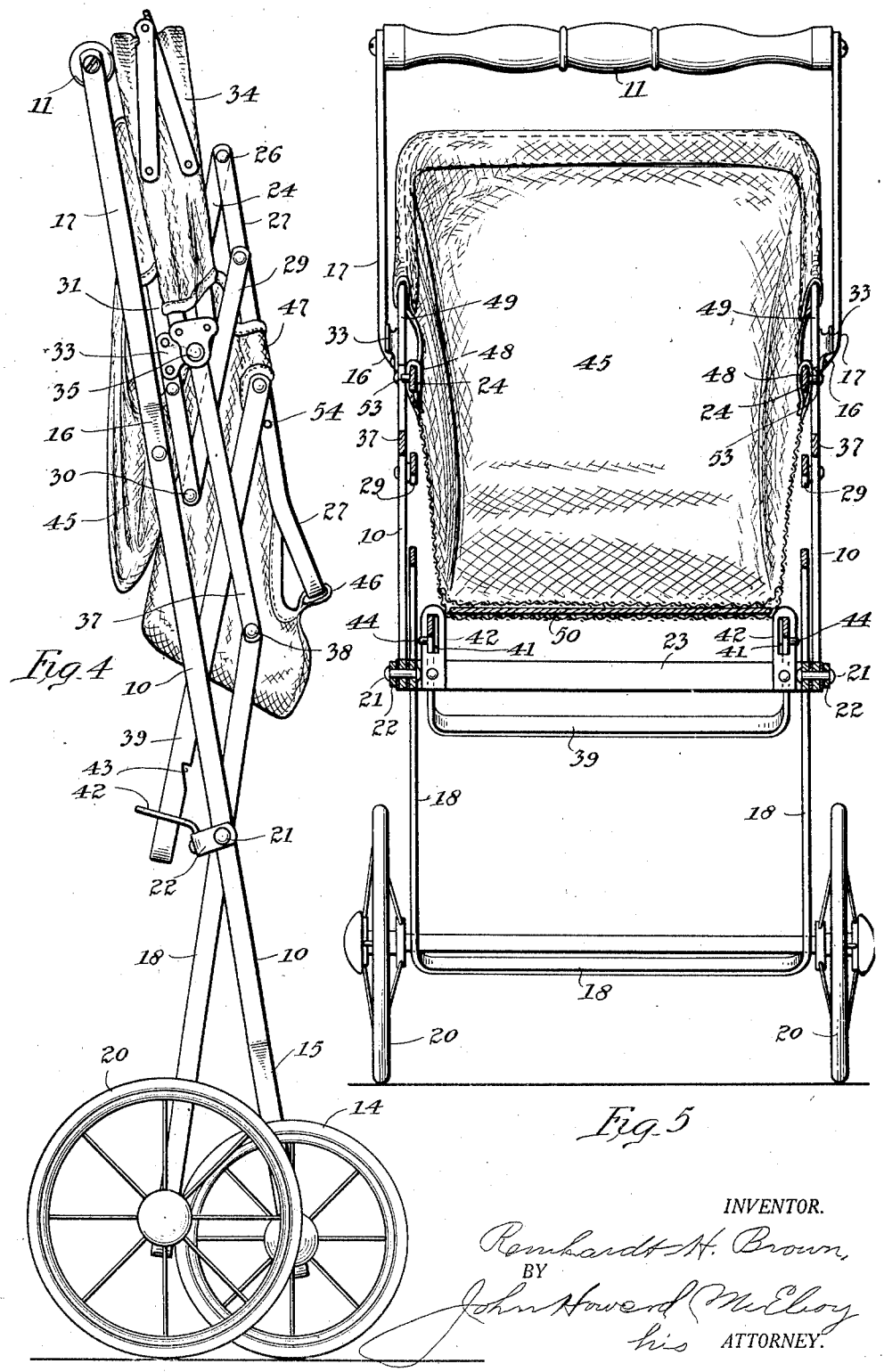

Patented June 25, 1929.

1,718,851

UNITED STATES PATENT OFFICE.

REINHARDT H. BROWN, OF LA PORTE, INDIANA, ASSIGNOR TO JOHN HOWARD McELROY, TRUSTEE.

CHILD'S COLLAPSIBLE VEHICLE.

Application filed September 29, 1928. Serial No. 309,238.

My invention is concerned with children's vehicles of the type that can be (1) collapsed for transportation; (2) erected so as to form a trough or carriage in which babies can lie down at full length; or (3) erected so as to form a seat and foot well in which a child able to sit up can be seated. To these ends, it consists of a simple and novel construction, as is fully shown in the accompanying drawings and hereinafter described, the novel features and combinations being particularly pointed out in the claims.

To illustrate my invention, I annex hereto three sheets of drawings, in which the same reference characters are used to designate identical parts in all the figures, of which,—

Fig. 2 is a similar view slightly modified but with the top omitted and with the body in the trough-like position;

Fig. 3 is a plan view in section on the line 3—3 of Fig. 1;

Fig. 4 is a side elevation of the vehicle in its collapsed position, ready for carrying by hand; and Fig. 5 is a front elevation in section on the line 5—5 of Fig. 1.

Figure 1:
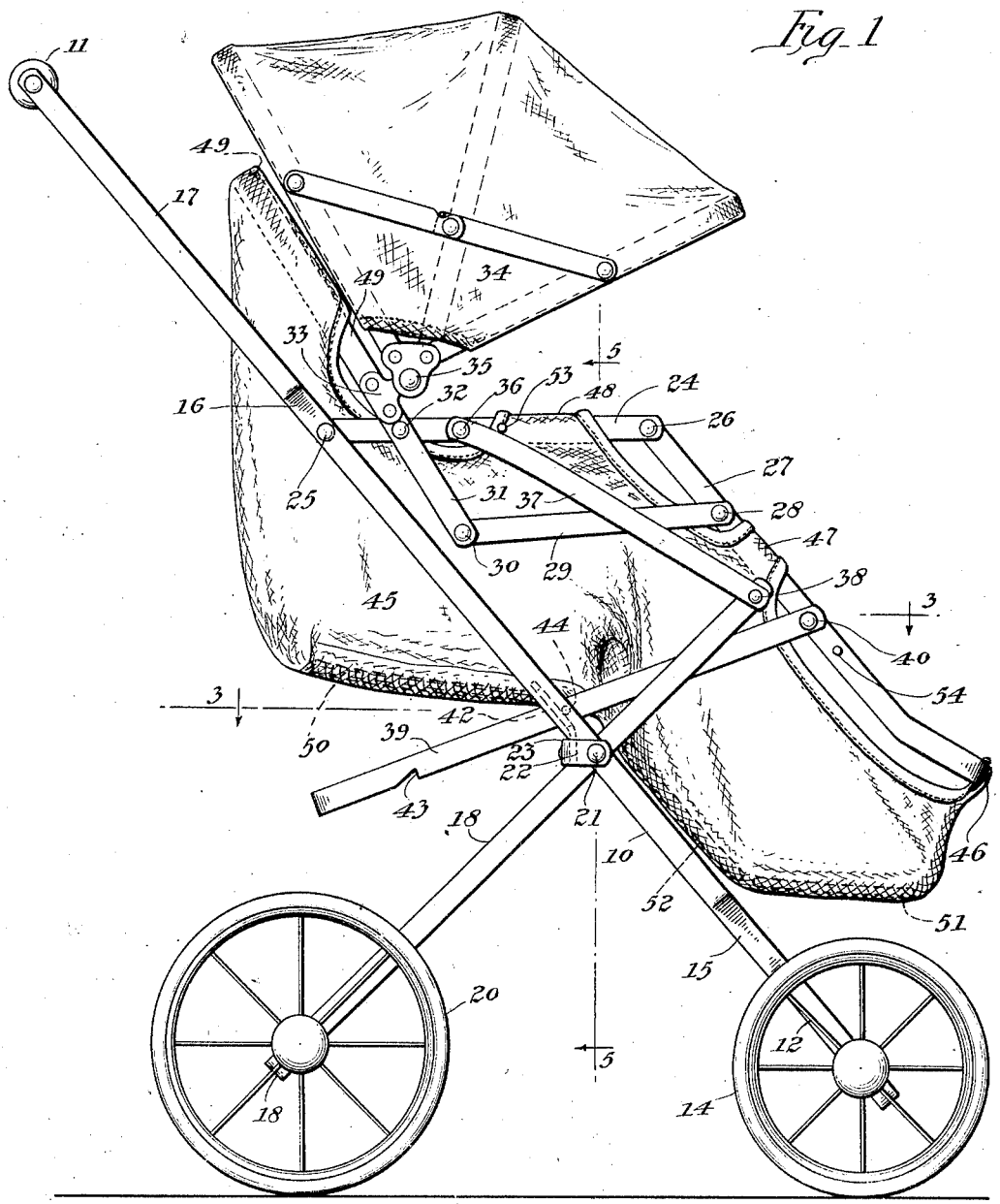
Fig. 1 is a side elevation of the vehicle erected and in sitting position, with the top in place and opened out.

What I call the front wheel frame 10 is preferably formed of a flat strip of metal bent into a generally U-shaped form, with its open end closed by the handle 11. It has the narrow U-shaped portion 12 at its lower end in which is secured the axle 13, on the ends of which are journaled the front wheels 14. The narrow lower end is connected by the offset portions 15 with the main portion already marked 10, and this in turn is connected by the smaller offsets 16 with the upper portion 17, which is widened out by said offset portions 16 to accommodate the parts when collapsed and in the trough-like position.

What I call the rear wheel frame 18 is similarly made of a strip of flat metal and is U-shaped in its outline, the lower closed end having secured therein the axle 19, on the ends of which are journaled the rear wheels 20 in the customary manner.

These front and rear wheel frames are pivotally connected by the rivets or bearing pins 21, which also extend through the ears 22 of the transverse bar 23 (see Figs. 3 and 5), the principal function of which is to prevent the wheels spreading too far when the carriage is erected, it being understood that this bar is engaged by both of the frames 10 and 18, as is clearly shown.

The normally horizontal frame 24 is preferably formed of two flat metal bars, as shown in Figs. 1 and 4, although it may be made of a single bar of U-shape, by forming the rearwardly extending portions 24ª, shown in Fig. 2. This frame 24 which combines the function of an arm rest frame and a seat supporting frame is pivoted at its rear end at 25 to the front wheel frame 10, and at its forward end at 26 to the open end of the generally U-shaped foot-well frame 27, which is preferably formed of a flat metal bar bent as shown. This foot-well frame has pivoted thereto at 28 the generally-horizontal links 29, which are pivoted at their rear ends at 30 to the open lower end of the U-shaped back-rest frame 31, which is preferably made of a flat strip of metal bent into the shape shown and pivoted at 32 to the horizontal frame 24. Where a top is employed, the ears 33 are riveted to the sides of the back-rest frame 30 and have the customary collapsing top 34 pivoted thereto at 35.

The normally horizontal frame 24 also has pivoted thereto at 36 the pair of links 37, the lower ends of which are pivoted at 38 to the open upper end of the rear wheel frame 18. A generally U-shaped locking frame 39, preferably made of a flat metal bar bent to the shape shown, is pivoted at 40 to the foot-well frame 37, and slides through apertures 41 in a pair of ears 42 which are riveted to the transverse bar 23. This locking bar 39 is provided with a pair of detent recesses 43 and with outwardly projecting pins or abutments 44 in the proper plane to engage the ears 42.

The body 45 of the vehicle is formed of canvas or some other suitable flexible material, which is of a trough-like shape when the parts are in the position shown in Fig. 2, and has at its forward end a loop 46 extending over substantially all of the transverse portion of the foot-well frame 27, and at each side with loops 47, through which extends the portion of the foot-well frame between the pivots 28 and 40. It has the pair of loops 48, through which extends the horizontal frame bars 24 between the pivots 36 and 26, and finally the elongated loop 49 at its rear end, through which extends the transverse portion and part of the sides of the back-rest frame 31.

To form a seat for the child when the parts are in the position shown in Fig. 1, I place within the fabric bottom of the body 45 a rigid, rectangular board 50, and to form a foot rest in the same position, I place in the forward end of the bottom a similar but narrower board 51, and I preferably locate between the two boards and adjacent the board 51 a similar board 52, the boards 50, 51 and 52 serving, when the parts are in the position shown in Fig. 2, to form a more level bottom of the trough for the child to lie in.

With the construction shown, the operation of the apparatus is as follows:

Starting with the parts in the position shown in Fig. 1, it will be seen that the foot-well frame 27 is swung down at an angle, and it is held in this position by the pins 44 engaging the ears 42. The links 29 serve to hold the back-rest frame 31 in a position substantially parallel to the foot-well frame 27, and the body thus sustained forms the foot well, seat and back rest, as will be readily apparent. The framework is held from collapsing downward not only by the action of the transverse bar 23, but also by reason of the pins 53 projecting outwardly from the middle portions of the horizontal bars 24 engaging the adjacent upper edges of the links 37.

When it is desired to have the vehicle assume the trough-like form shown in Fig. 2, all that is necessary is to shove the locking frame 39 forwardly and upwardly until the detent notches 43 engage the lower edges of the slots 41, when the parts will be held, as clearly shown in Fig. 2.

When the vehicle is to be collapsed, the top is folded, as seen in Fig. 4, into the position shown, where it is substantially parallel to the back-rest frame 49, when the frame-work may be grasped at the rivet 26 on both sides and lifted up, and the parts will then naturally collapse into the position shown in Fig. 4, where it will be in stable equilibrium despite the narrow wheel base formed by the wheels being brought as close together as possible. To prevent the foot-well frame from being thrust in so far as to destroy the balance of the parts in the collapsed position, I employ a pair of pins 54 projecting outwardly from the foot-well frame 27 near the pivotal point 40 of the locking frame 39, with the edges of which said pins 54 engage when the parts are collapsed, as seen in Fig. 4.

While I have herein shown and described, in a child's conveyance, the combination with a horizontal frame, of U-shaped foot-well and back-rest frames pivoted thereto, and connected by a flexible body receptacle adapted to have its bottom horizontal to form a hammock or to have its front portion lowered on the foot-well frame and its rear portion raised with the back-rest frame, together with connections between the back-rest and foot-well frames so that when the back-rest frame is lowered the foot-well frame will be raised and vice versa, together with collapsible supporting means from said horizontal frame so that said means may be collapsed upon said frames, and the frames, supporting means and flexible body receptacle all collapsed into a small compass, I do not herein claim the aforesaid combination or sub-combinations thereof broadly, but reserve the same for my application No. 754,256, filed December 6, 1924.

What I claim as new, and desire to secure by Letters Patent of the United States, is:

1. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal arm rest and seat supporting frame connected toward its rear end to the front wheel frame and at its front end to the foot-well frame, a flexible body, part of which forms the seat, connected at its edges to the normally horizontal arm rest and seat supporting frame and to the foot-well frame, and links connecting the upper end of the rear wheel frame with the central portion of the horizontal arm rest and seat supporting frame so that when the lower ends of the wheel frames are swung together, the pivotal connections of the foot-well frame and the normally horizontal frame are moved upward away from the pivotal connections of the wheel frames and the entire foot-well frame is raised and swung over toward the upper part of the front-wheel frame.

2. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, means for limiting the relative angular movement of said wheel frames, a detent adjacent said means, and a bar pivoted at its upper end to the foot-well frame and having toward its lower end a recess to catch on said detent to hold the foot-well frame in a substantially horizontal position when desired.

3. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, means for limiting the relative angular movement of said wheel frames, a pair of detents adjacent said means, and a pair of bars pivoted at their upper ends to the foot-well frame and connected at their lower ends to form a U-shaped frame and each bar having toward its lower end a recess to catch on one of said detents to hold the foot-well frame in a substantially horizontal position when desired.

4. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, links connecting the upper end of the rear wheel frame with the central portion of the horizontal frame so that when the lower ends of the wheel frames are swung together, the pivotal connections of the foot-well frame and the normally horizontal frame are moved upward away from the pivotal connections of the wheel frames and the entire foot-well frame is raised and swung over toward the upper part of the front-wheel frame, a pair of bars pivoted at their upper ends to the foot-well frame and connected at their lower ends to form a U-shaped frame and each bar having toward its lower end a recess to catch on a detent to hold the foot-well frame in a substantially horizontal position when desired, a transverse bar having ears pivoted to the two wheel frames where they are pivoted together and serving to limit the distance the pairs of wheels may be separated when the carriage is in use, and a pair of detents carried by the transverse bar with which said recesses co-operate.

5. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, a pair of bars pivoted at their upper ends to the foot-well frame and connected at their lower ends to form a U-shaped frame and each bar having toward its lower end a recess to catch on a detent to hold the foot-well frame in a substantially horizontal position when desired, a transverse bar having ears pivoted to the two wheel frames where they are pivoted together and serving to limit the distance the pairs of wheels may be separated when the carriage is in use, and a pair of slotted ears extending from said bar through the slots of which the recessed bars extend.

6. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, a pair of bars pivoted at their upper ends to the foot-well frame and connected at their lower ends to form a U-shaped frame and each bar having toward its lower end a recess to catch on a detent to hold the foot-well frame in a substantially horizontal position when desired, a transverse bar having ears pivoted to the two wheel frames where they are pivoted together and serving to limit the distance the pairs of wheels may be separated when the carriage is in use, and a pair of slotted ears extending from said bar through the slots of which the recessed bars extend, said recessed bars being provided with abutments to engage the slotted ears when the foot-well frame is lowered.

7. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal arm rest and seat supporting frame connected toward its rear end to the front wheel frame and at its front end to the foot-well frame, a back-rest frame pivoted intermediate its ends to the normally horizontal arm rest and seat supporting frame, links connecting the lower end of the back-rest frame with the foot-well frame so that when the foot-well frame is lowered the back-rest frame is raised, and vice versa, a flexible body, part of which forms a seat, connected at its edges to the foot-well frame, to the normally horizontal arm rest and seat supporting frame, and to the back-rest frame, and links connecting the upper of the rear wheel frame with the central portion of the horizontal arm rest and seat supporting frame so that when the lower ends of the wheel frames are swung together, the pivotal connections of the foot-well frame and the normally horizontal frame are moved upward away from the pivotal connections of the wheel frames and the entire foot-well frame is raised and swung over toward the upper part of the front-wheel frame.

8. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, a back-rest frame pivoted intermediate its ends to the normally horizontal frame, links connecting the lower end of the back-rest frame with the foot-well frame so that when the foot-well frame is lowered the back-rest frame is raised, and vice versa, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, means for limiting the relative angular movement of said wheel frames, a pair of detents adjacent said means, and a pair of bars pivoted at their upper ends to the foot-well frame and connected at their lower ends to form a U-shaped frame and each bar having toward its lower end a recess to catch on one of said detents to hold the foot-well frame in a substantially horizontal position when desired.

9. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, a back-rest frame pivoted intermediate its ends to the normally horizontal frame, links connecting the lower end of the back-rest frame with the foot-well frame so that when the foot-well frame is lowered the back-rest frame is raised, and vice versa, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, a pair of bars pivoted at their upper ends to the foot-well frame and connected at their lower ends to form a U-shaped frame and each bar having toward its lower end a recess to catch on a detent to hold the foot-well frame in a substantially horizontal position when desired, a transverse bar having ears pivoted to the two wheel frames where they are pivoted together and serving to limit the distance the pairs of wheels may be separated when the carriage is in use, and a pair of detents carried by the transverse bar with which said recesses co-operate.

10. In a child's carriage, the combination with a front wheel frame having front wheels journaled in the lower end thereof, of a rear wheel frame pivoted thereto and having rear wheels journaled in the lower end thereof, a foot-well frame extending substantially paralllel to the front wheel frame when erected in sitting position, a normally horizontal frame connected toward its rear end to the front wheel frame and at its front end to the foot-well frame, a back-rest frame pivoted intermediate its ends to the normally horizontal frame, links connecting the lower end of the back-rest frame with the foot-well frame so that when the foot-well frame is lowered the back-rest frame is raised, and vice versa, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, a pair of bars pivoted at their upper ends to the foot-well frame and connected at their lower ends to form a U-shaped frame and each bar having toward its lower end a recess to catch on a detent to hold the foot-well frame in a substantially horizontal position when desired, a transverse bar having ears pivoted to the two wheel frames where they are pivoted together and serving to limit the distance the pairs of wheels may be separated when the carriage is in use, and a pair of slotted ears extending from said bar through the slots of which the recessed bars extend.

11. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, a back-rest frame pivoted intermediate its ends to the normally horizontal frame, links connecting the lower end of the back-rest frame with the foot-well frame so that when the foot-well frame is lowered the back-rest frame is raised, and vice versa, links connecting the upper end of the rear wheel frame with the central portion of the horizontal frame so that when the lower ends of the wheel frames are swung together the pivotal connections of the foot-well frame and the normally horizontal frame are moved upward away from the pivotal connections of the wheel frames and the entire foot-well frame is raised and swung over toward the upper part of the front-wheel frame, a pair of bars pivoted at their upper ends to the foot-well frame and connected at their lower ends to form a U-shaped frame and each bar having toward its lower end a recess to catch on a detent to hold the foot-well frame in a substantially horizontal position when desired, a transverse bar having ears pivoted to the two wheel frames where they are pivoted together and serving to limit the distance the pairs of wheels may be separated when the carriage is in use, and a pair of slotted ears extending from said bar through the slots of which the recessed bars extend, said recessed bars being provided with abutments to engage the slotted ears when the foot-well frame is lowered.

12. In a child's carriage, the combination with a generally U-shaped front wheel frame having front wheels journaled in the lower end thereof, of a generally U-shaped rear wheel frame pivoted thereto and having rear wheels journaled in the lower end thereof, a generally U-shaped foot-well frame extending substantially parallel to the front wheel frame when erected in sitting position, a normally horizontal frame connected toward its rear end to the front wheel frame and at its front end to the foot-well frame, a back-rest frame pivoted intermediate its ends to the normally horizontal frame, a pair of links connecting the lower end of the back-rest frame with the foot-well frame so that when the foot-well frame is lowered the back-rest frame is raised, and vice versa, a flexible trough-like body connected at its edges to the foot-well, the normally-horizontal and the back-rest frames, another pair of links connecting the upper end of the rear-wheel frame with the central portion of the horizontal frame so that when the lower ends of the wheel frames are swung together, the pivotal connections of the foot-well frame and the normally horizontal frame are moved upward away from the pivotal connections of the wheel frames and the entire foot-well frame is raised and swung over toward the upper part of the front-wheel frame, means for limiting the relative angular movement of said wheel frames, a pair of detents adjacent said means, and a pair of bars pivoted at their upper ends to the foot-well frame and connected at their lower ends to form a U-shaped frame, each of said bars having toward its lower end a recess to catch on one of said detents to hold the foot-well frame in a substantially horizontal position when desired.

13. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal arm rest and seat supporting frame connected toward its rear end to the front wheel frame and at its front end to the foot-well frame, a flexible body, part of which forms the seat, connected at its edges to the normally horizontal arm rest and seat supporting frame and to the foot-well frame, links connecting the upper end of the rear wheel frame with the central portion of the horizontal arm rest and seat supporting frame so that when the lower ends of the wheel frames are swung together, the pivotal connections of the foot-well frame and the normally horizontal frame are moved upward away from the pivotal connections of the wheel frames and the entire foot-well frame is raised and swung over toward the upper part of the front-wheel frame, and abutments carried by the normally horizontal frame and engaging the upper sides of the links near their upper ends when the carriage is extended to keep said normally horizontal frame horizontal.

14. In a child's carriage, the combination with a front wheel frame having front wheels journaled in the lower end thereof, of a rear wheel frame pivoted thereto and having rear wheels journaled in the lower end thereof, a foot-well frame extending substantially parallel to the front wheel frame when erected in sitting position, a normally horizontal frame connected toward its rear end to the front wheel frame and at its front end to the foot-well frame, links connecting the upper end of the rear wheel frame with the central portion of the horizontal frame so that when the lower ends of the wheel frames are swung together, the pivotal connections of the foot-well frame and the normally horizontal frame are moved upward away from the pivotal connections of the wheel frames and the entire foot-well frame is raised and swung over toward the upper part of the front-wheel frame, means for limiting the relative angular movement of said wheel frames, a pair of detents adjacent said means, a pair of bars pivoted at their upper ends to the foot-well frame and connected at their lower ends to form a U-shaped frame and each bar having toward its lower end a recess to catch on one of said detents to hold the foot-well frame in a substantially horizontal position when desired, and abutments carried by the foot-rest frame to engage the pair of bars when the carriage is collapsed.

In witness whereof, I have hereunto set my hand this 27th day of September, 1928.

REINHARDT H. BROWN.